(12) United States Patent
Mamidwar et al.

(10) Patent No.: US 9,838,729 B2
(45) Date of Patent: Dec. 5, 2017

(54) RECOVERING CHANNEL BONDED PROGRAM STREAMS

(71) Applicant: BROADCOM CORPORATION, Irvine, CA (US)

(72) Inventors: Rajesh Shankarrao Mamidwar, San Diego, CA (US); Anand Tongle, San Diego, CA (US); Eng Choon Ooi, Singapore (SG)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 203 days.

(21) Appl. No.: 14/147,438

(22) Filed: Jan. 3, 2014

(65) Prior Publication Data

US 2015/0128200 A1 May 7, 2015

Related U.S. Application Data

(60) Provisional application No. 61/900,928, filed on Nov. 6, 2013.

(51) Int. Cl.
| | |
|---|---|
| *H04N 7/173* | (2011.01) |
| *H04N 21/426* | (2011.01) |
| *H04N 21/434* | (2011.01) |
| *H04N 21/4385* | (2011.01) |
| *H04N 21/63* | (2011.01) |

(52) U.S. Cl.
CPC ... *H04N 21/42615* (2013.01); *H04N 21/4347* (2013.01); *H04N 21/4385* (2013.01); *H04N 21/631* (2013.01)

(58) Field of Classification Search
None
See application file for complete search history.

(56) References Cited

U.S. PATENT DOCUMENTS

| | | | | |
|---|---|---|---|---|
| 6,977,934 B1 * | 12/2005 | Dalby | ............... | H04L 29/06 370/394 |
| 7,151,831 B2 * | 12/2006 | Candelore | ............... | H04N 7/162 348/E5.004 |
| 7,614,064 B2 * | 11/2009 | Zigmond | ............... | H04H 60/31 725/13 |
| 8,255,576 B2 * | 8/2012 | Siulinski | ............... | H04L 12/2803 710/15 |

(Continued)

*Primary Examiner* — Mushfikh Alam
(74) *Attorney, Agent, or Firm* — McDermott Will & Emery LLP

(57) ABSTRACT

A system for recovering channel bonded program streams may include filters and a collator. The filters may be configured to receive data streams that include multiple chunks of transport stream packets, and marker information items that are indicative of boundaries of the chunks, over multiple bonded channels, and to individually filter the data streams based at least on a utilized program identifier. The collator may be configured to collate the filtered data streams based at least on the marker information items to recover a program stream corresponding to the utilized program identifier. In one or more implementations, the filters may replace, or augment, the marker information items with marker packets that include a program identifier that is not being used for transmitted programs and/or that is reserved for marker packets. The collator may collate the filtered data streams based at least on the marker packets.

20 Claims, 13 Drawing Sheets

(56) References Cited

U.S. PATENT DOCUMENTS

| | | | |
|---|---|---|---|
| 8,903,398 B2* | 12/2014 | Carter | H04W 76/002 455/436 |
| 2002/0056127 A1* | 5/2002 | Amir | H04N 7/17336 725/90 |
| 2006/0136976 A1* | 6/2006 | Coupe | H04L 65/604 725/131 |
| 2007/0097907 A1* | 5/2007 | Cummings | H04L 49/90 370/329 |
| 2008/0212613 A1* | 9/2008 | Perkinson | H04L 47/125 370/475 |
| 2009/0300673 A1* | 12/2009 | Bachet | H04N 7/17318 725/31 |
| 2010/0131996 A1* | 5/2010 | Gauld | H04N 21/47202 725/100 |
| 2010/0269147 A1* | 10/2010 | Zetterower | H04N 5/782 725/114 |
| 2011/0096234 A1 | 4/2011 | Mamidwar et al. | |
| 2011/0154425 A1* | 6/2011 | Kim | H04N 21/2385 725/116 |
| 2011/0222545 A1* | 9/2011 | Eleftheriadis | H04L 12/6418 370/394 |
| 2012/0106330 A1* | 5/2012 | Davidson | H04L 69/22 370/230 |
| 2012/0144445 A1* | 6/2012 | Bonta | H04L 12/1868 725/116 |
| 2013/0239142 A1 | 9/2013 | Chen et al. | |
| 2014/0282722 A1* | 9/2014 | Kummer | H04N 21/23418 725/35 |
| 2015/0180559 A1* | 6/2015 | Kim | H04B 7/0452 370/338 |
| 2016/0029068 A1* | 1/2016 | Kim | H04N 21/23608 725/109 |

* cited by examiner

RECOVERING CHANNEL BONDED PROGRAM STREAMS

CROSS-REFERENCE TO RELATED APPLICATIONS

The present application claims the benefit of U.S. Provisional Patent Application Ser. No. 61/900,928, entitled "Recovering Channel Bonded Program Streams," filed on Nov. 6, 2013, which is hereby incorporated by reference in its entirety for all purposes.

TECHNICAL FIELD

The present description relates generally to channel bonded program streams and, in particular, relates to recovering channel bonded program streams.

BACKGROUND

In channel bonding systems, such as transponder bonded systems, transport stream packets of audio streams and/or video streams corresponding to multiple different programs are multiplexed and/or interleaved together to form a single transport stream that may be referred to as a fat transport stream. The programs corresponding to the individual transport stream packets may be determinable from program identifiers (PIDs) carried in headers of the transport stream packets. The transport stream packets of the fat transport stream are then segmented into chunks, e.g. that include one or more transport stream packets, and marker information is added to indicate the chunk boundaries and provide information about the chunks. The chunks are distributed into chunk data streams for transmission over multiple bonded physical channels, such as coaxial channels, Ethernet channels, wireless channels, etc.

A receiving device receives the chunk data streams over the multiple bonded physical channels and may buffer the received chunk data streams, e.g. in DRAM. For example, the receiving device may buffer the received chunk data streams to compensate for latency differences between the different physical channels. A collator of the receiving device may reconstruct the fat transport stream by aligning the chunks based at least on the marker information. A filter of the receiving device, e.g. a PID filter, may then filter the reconstructed fat transport stream, based at least on the PIDs of the transport stream packets, to retrieve the audio and/or video streams corresponding to one of the programs, e.g. a program being presented to a user.

Although the receiving device may only utilize the transport stream packets corresponding to one of the programs carried by the fat transport stream, the receiving device may allocate memory and processing resources towards reconstructing the entire fat transport stream, e.g. including the transport stream packets that are not utilized by the receiving device. For example, if the difference between the latencies associated with the different physical channels is high, a large amount of buffer space may be required to buffer the entire chunk data streams. Furthermore, the collator may need to process the transport stream packets of the chunk data streams at the aggregate rate of the multiple bonded channels.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
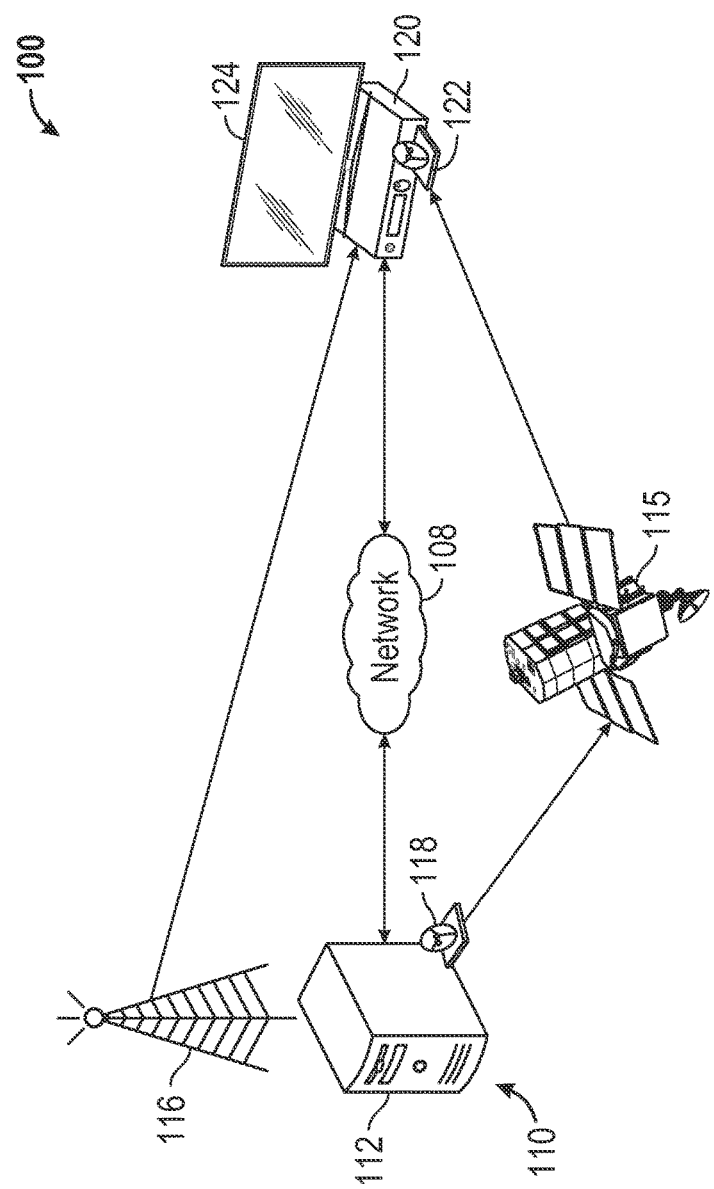
FIG. 1 illustrates an example network environment in which a system for recovering channel bonded program streams may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system for recovering channel bonded program streams, a receiving device may include chip-level filters that filter the transport stream packets of chunk data streams received over multiple bonded channels, e.g. based at least on the PIDs of the transport stream packets, before the chunks are aligned to reconstruct a single stream. The filters may drop any transport stream packets that are not associated with the program being utilized by the receiving device, e.g. the program being presented to a user by the receiving device; however, the filters may allow the marker information, such as marker packets, to pass through. A component of the receiving device, such as a collator, may then collate the filtered chunk data streams to recover the program stream based at least on the marker information. Since the filtered chunk data streams may only include transport stream packets that correspond to the program stream being utilized by the receiving device, the receiving device may not need to expend processing and memory resources, e.g. buffer space, on transport stream packets that are not being utilized by the receiving device. Furthermore, the collator of the receiving device may only need to process the transport stream packets at an average rate for the program stream, rather than the aggregate rate of the bonded channels.

In one or more implementations, the subject system may be operable with at least a portion of existing chipsets, such as collators of receiving devices that are not configured to recognize marker information corresponding to chunk boundaries. For example, the chip-level filters associated with the bonded channels may be configured to identify marker information in the chunk data streams, and to generate marker packets that includes at least a portion of the marker information and a specific PID, e.g. a PID not being used to identify any programs. The chip-level filters may also filter the transport stream packets of the chunk data stream based at least on the PIDs, as previously discussed. The filtered chunk data streams may then be passed to per channel based buffers where they may be retrieved and processed by a collator, e.g. of an existing chipset. The collator may be configured to identify that the specific PID corresponds to a packet that includes marker information. In this manner the collator can reconstruct a single stream from the filtered chunk data streams and the marker packets inserted by the chip-level filters, even though the collator maybe unable to identify the marker information in the chunk data streams. In one or more implementations, the chip-level filters may be located on a first chip, such as a front-end chip, and the collator may be located on a second chip, such as an existing back-end chip. Alternatively, in one or more implementations, the filters and collator may be collocated on the same chip.

FIG. 1 illustrates an example network environment 100 in which a system for recovering channel bonded program streams may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a content delivery network (CDN) 110 that is communicably coupled to a network device 120, such as by a network 108. In one or more implementations, the example network environment 100 may further include one or more electronic devices (not shown), such as client devices, that are communicably coupled to the network device 120. The network 108 may be a public communication network (such as the Internet, cellular data network, dialup modems over a telephone network) or a private communications network (such as private local area network ("LAN"), leased lines). In one or more implementations, the network 108 may include one or more transmission networks, such as a coaxial transmission network, a fiber optic transmission network, or generally any transmission network that communicatively couples the server 112 and the network device 120.

The CDN 110 may include, and/or may be communicably coupled to, a server 112, an antenna 116 for transmitting audio and/or video (AV) streams, such as via multiplexed bitstreams, over the air, and a satellite transmitting device 118 that transmits AV streams, such as via multiplexed bitstreams to a satellite 115. In one or more implementations, the AV streams may include Motion Picture Expert Group 2 (MPEG2) transport stream (TS) packets, or any other data units and/or containers that may be used to transmit audio and/or video data. The network device 120 may include, and/or may be coupled to, a satellite receiving device 122, such as a satellite dish, that receives data streams, such as multiplexed bitstreams, from the satellite 115. In one or more implementations, the network device 120 may further include an antenna for receiving data streams, such as multiplexed bitstreams over the air from the antenna 116 of the CDN 110. The server 112 and/or the network device 120, may be, or may include, one or more components of the electronic system discussed below with respect to FIG. 9.

In one or more implementations, the network device 120 may also be, or may also include, a set-top box, e.g. a device that is coupled to, and is capable of presenting AV programs on, an output device 124, such as a television, a monitor, speakers, or any device capable of presenting audio and/or video programs. In one or more implementations, the network device 120 may be integrated into the output device 124. The network device 120 may receive AV streams from the server 112, such as multiplexed bitstreams, that include AV programs, such as television programs, movies, or generally any AV content. The network device 120 may receive the AV streams from the server 112 via the antenna 116, via the network 108, and/or via the satellite 115.

In one or more implementations, the server 112 may transmit AV streams to the network device 120 over multiple bonded channels. For example, the server 112 and/or the network device 120 may include multiple transceivers, or transponders, for communicating over multiple physical communication channels. The communication channels may include satellite relay channels, e.g. via the satellite transmitting device 118, the satellite 115, and the satellite receiving device 122, asymmetric digital subscriber line (ADSL) or ADSL 2 channels, coaxial cable channels, wireless channels such as 802.11a/b/g/n channels or 60 gigahertz (GHz) WiGig channels, fiber optic channels, Ethernet channels, power line channels, and/or other types of communication channels. For explanatory purposes, the server 112 is discussed herein as transmitting audio and/or video streams over multiple bonded channels to the network device 120. However, the subject system may be used by the server 112 to transmit any type of data to the network device 120, and vice-versa.

The server 112 may multiplex and/or interleave transport stream packets of audio streams and/or video streams corresponding to multiple different programs into a single transport stream that may be referred to as a fat source transport stream (FSTS). The transport stream packets may be associated with program identifiers (PIDs) that are indicative of the programs corresponding to the transport stream packets. The server 112 may segment the transport stream packets of the fat source transport stream into chunks, and may add marker information to indicate the chunk boundaries and to provide information about the subsequent chunks. The server 112 may distribute the chunks into chunk data streams for transmission over the multiple bonded channels. An example transmit path of the server 112, or other devices transmitting data streams over multiple bonded channels, such as the satellite 115, is discussed further below with respect to FIGS. 2 and 3.

The network device 120 may receive the chunk data streams over the multiple bonded communication channels and may buffer the received chunk data streams in per-channel buffers, e.g. in dynamic random-access memory (DRAM), or other memory. For example, the network device 120 may buffer the received chunk data streams to compensate for latency differences between the communication channels. In one or more implementations, the network device 120 may collate the chunk data streams to reconstruct a single transport stream that may be referred to as a fat destination transport stream (FDTS). The network device 120 may then filter the fat destination transport stream, e.g. based at least on the PIDs of the transport stream packets, to retrieve the audio and/or video streams corresponding to one or more programs being utilized by the network device 120, e.g. a program being presented to a user on output device 124. An example receive path of the network device 120, or other devices receiving data streams over multiple bonded channels, that collates the chunk data streams into a single transport stream before filtering the transport stream packets is discussed further below with respect to FIGS. 2 and 3.

In one or more implementations, the network device 120 may use chip-level filters to filter the transport stream packets of each of the individual received chunk data streams, based at least on the PIDs of the transport stream packets, to retrieve the audio and/or video streams corresponding to one or more programs being utilized by the network device 120, e.g. a program being presented to a user, before collating the chunk data streams to reconstruct a single transport stream. In one or more implementations, if the network device 120 is only utilizing a single program stream, the network device 120 may reconstruct the single program stream from the filtered chunk data streams based at least on the marker information. An example receive path of the network device 120, or other devices receiving data streams over multiple bonded channels, that filters the chunk data streams before collating the chunk data streams is discussed further below with respect to FIGS. 5 and 7.

In one or more implementations, the chip-level filters may also identify marker information in the chunk data streams, and generate marker packets that includes at least a portion of the marker information and a specific PID, e.g. a PID not being used to identify any programs. In this manner, the chunk data streams may be processed by a component of the network device 120 that is configurable to detect PIDs, but may not be configurable to detect separate marker information. An example receive path of the network device 120, or other devices receiving data streams over multiple bonded channels, that filters the chunk data streams, identifies marker information, and inserts marker packets, before collating the chunk data streams is discussed further below with respect to FIGS. 6 and 8.

Figure 2A:
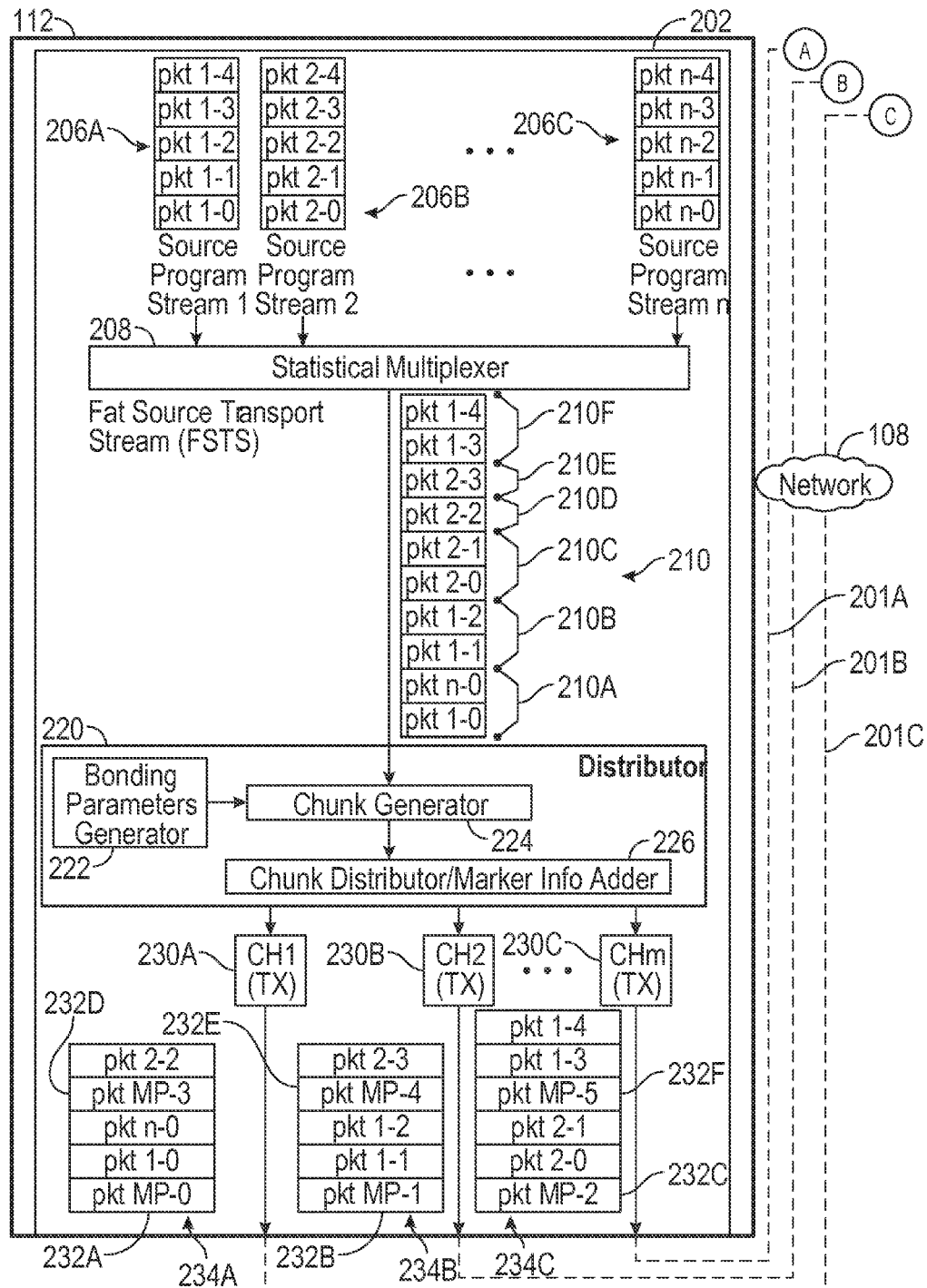
FIGS. 2A-2B illustrate an example network environment in which a system for recovering channel bonded program streams may be implemented in accordance with one or more implementations.
Figure 2B:
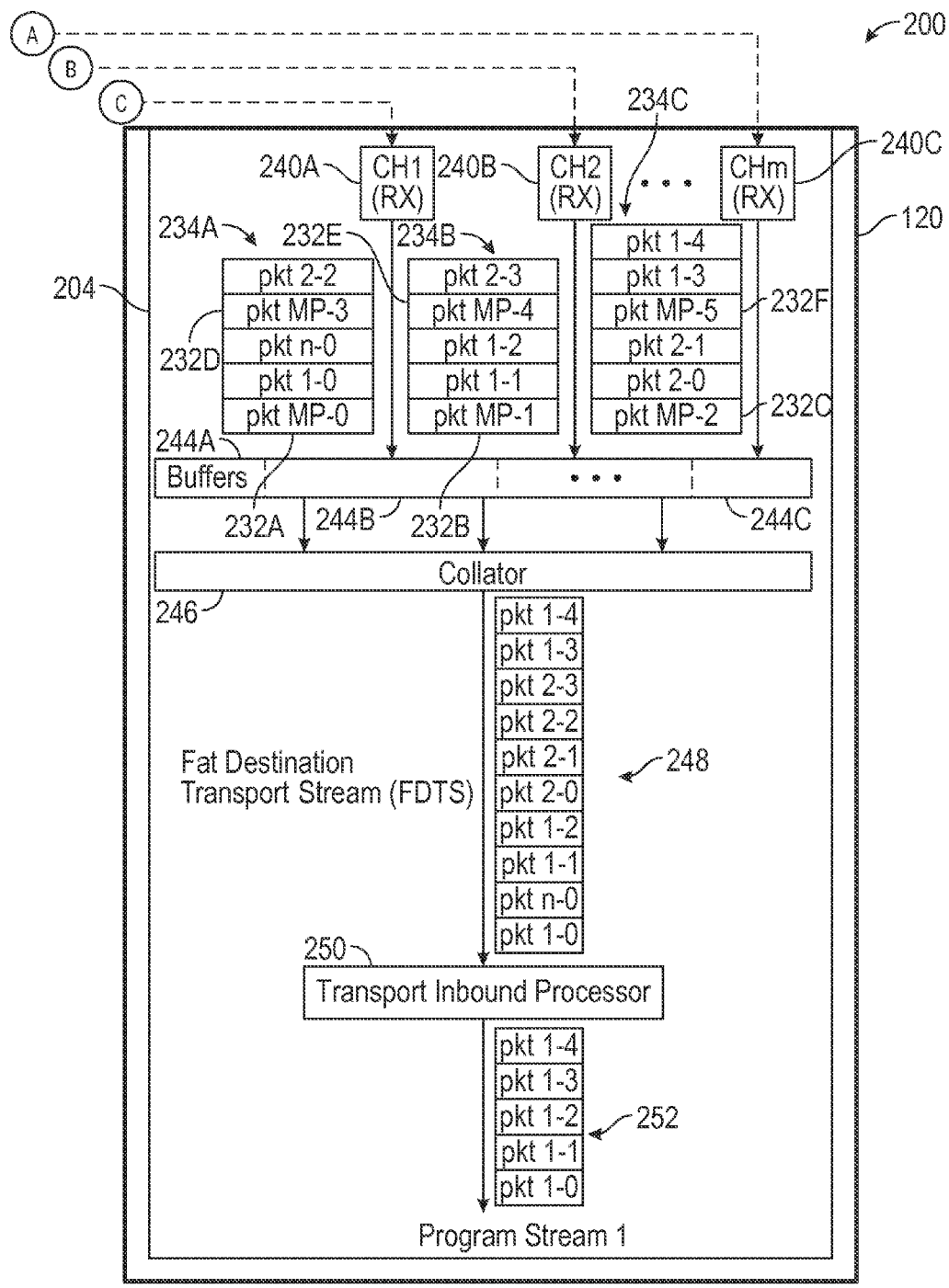

FIGS. 2A-2B illustrate an example network environment 200 in which a system for recovering channel bonded program streams may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 200 may include a server 112, a network device 120, and a network 108. The server 112 may transmit data, such as audio and/or video streams, to the network device 120 over the network 108 via multiple bonded channels 201A-C. The server 112 may include a transmit path 202, and the transmit path 202 may include a statistical multiplexer 208, a distributor 220, and transmitters 230A-C. The distributor 220 may include a bonding parameters generator 222, a chunk generator 224, and a chunk distributor/marker info adder 226. The network device 120 may include a receive path 204 that may include receivers 240A-C, buffers 244A-C, such as first-in-first-out (FIFO) buffers, a collator 246, and a transport inbound processor (TIP) 250.

In operation, the server 112 and the network device 120 may exchange configuration communications, e.g. before transmitting over the bonded channels 201A-C. The configuration communications may be transmitted over an out-of-band or in-band channel between the server 112 and the network device 120. In one or more implementations, the server 112 may transmit configuration parameters corresponding to the bonded channels 201A-C to the network device 120. The configuration parameters may include, for example, the number of bonded channels 201A-C, the types of programs and/or data that the bonded channels 201A-C will carry, marker packet format for the bonded channels 201A-C, chunk, program packet, or marker packet size, chunk, program packet, or marker packet PID or sequence number information, or any other chunk or bonding configuration information that facilitates processing of the bonded channels 201A-C by the network device 120.

After any configuration parameters have been transmitted, the statistical multiplexer 208 of the transmit path 202 may receive source program streams 206A-C from one or more input sources. There may be any number of such input sources carrying any type of audio, video, or other type of data (e.g., web pages or file transfer data). In one or more implementations, the source program streams 206A-C may include MPEG or MPEG2 TS packets for digital television (e.g., individual television programs or stations), and/or 4K×2K High Efficiency Video Coding (HVEC) video (e.g., H.265/MPEG-H) data; however, the input sources may provide any type of input data. In one or more implementations, the source program streams 206A-C (e.g., MPEG 2 packets) may include program identifiers (PIDs) that indicate a specific program to which the audio and/or video data in the packets belongs.

The statistical multiplexer 208 multiplexes and/or interleaves the source program streams 206A-C into a fat source transport stream (FSTS) 210. In one or more implementations, the statistical multiplexer 208 facilitates efficient data transmissions by reducing idle time between transport stream packets in the fat source transport stream 210. In that regard, the statistical multiplexer 208 may interleave the transport stream packets of the source program streams 206A-C together to form the FSTS 210. For example, the statistical multiplexer 208 may allocate additional FSTS 210 bandwidth among high bit rate source program streams 206A-C, and relatively less bandwidth among low bit rate source program streams 206A-C, to provide the bandwidth needed to convey widely varying types of content at varying bit rates to the network device 120, e.g. at any desired quality level.

The FSTS 210 may be associated with a data rate that exceeds the transport capability of any of the individual bonded channels 201A-C between the server 112 and the network device 120. For example, the data rate associated with the FSTS 210 may exceed the data rate supported by a particular cable communication channel coupled to the server 112. To help deliver the aggregate bandwidth of the FSTS 210 to the network device 120 over the multiple bonded channels 201A-C, the transmit path 202 includes the distributor 220 and transmitters 230A-C. In one or more implementations, one or more of the transmitters 230A-C may be, and/or may include, one or more modulators and/or may include any other components configured to transmit data over the respective bonded channels 201A-C.

The bonding parameters generator 222 of the distributor 220 may generate bonding parameters for bonding the channels 201A-C. The chunk generator 224 of the distributor 220 may generate chunks from the FSTS 210. The chunks may include one or more transport stream packets from any of the source program streams 206A-C. The chunk generator 224 may use the same or different chunk size for chunks transmitted over any of the bonded channels 201A-C. Furthermore, the distributor 220 and/or the bonding parameters generator 222, may change the chunk size used by the chunk generator 224 for any of the bonded channels 201A-C at any time, such as in response to an analysis of any desired chunk size criteria. For the purposes of illustration, FIG. 2 shows six chunks that the chunk generator 224 of the distributor 220 has prepared for transmission over the bonded channels 201A-C via the transmitters 230A-C. In particular, the first three chunks are two-packet chunks 210A-C, the next two chunks are one-packet chunks 210D-E, and the next chunk is a two-packet chunk 210F.

The chunk distributor/marker info adder 226 of the transmit path 202 generates marker packets 232A-F that precede the chunks. In one or more implementations, the marker packets may indicate boundaries of the chunks and/or may provide information regarding the chunks. The marker packets 232A-F may be MPEG2 TS packets, for example, with an identifier that flags them as marker packets 232A-F. In one or more implementations, the chunk distributor/marker info adder 226 may add marker packets on a per-channel basis, for example in a round-robin manner, or on a per-chunk basis, for example in a round-robin manner at chunk boundaries. In one or more implementations, the chunk distributor/marker info adder 226 inserts the marker information into available fields in any packets, such as adaptation fields in MPEG2 TS packets generated to convey audio and video data. In one or more implementations, the marker packets 232A-F may include a sequence number that is indicative of the order of the following chunks with respect to the FSTS 210. In this manner, the sequence numbers of the marker packets 232A-F may be used by the network device 120 to reconstruct the FSTS 210. In one or more implementations, the marker information may be contained in any packets, such as video, audio, and/or system data packets.

The chunk distributor/marker info adder 226 of the distributor 220 may distribute the marker packets 232A-F and the chunks 210A-F to the transmitters 230A-C as chunk data streams 234A-C to be transmitted (e.g., in a round-robin manner) across the bonded channels 201A-C. In the example of FIG. 1, chunk distributor/marker info adder 226 of the distributor 220 distributes a marker packet (e.g., marker packet 232A, marker packet 232B, and marker packet 232C) to each transmitter 230A-C followed by a two-packet chunk 210A behind marker packet 232A, a two-packet chunk 210B behind marker packet 232B, and a two-packet chunk 210C behind marker packet 232C, in round-robin sequence, such as transmitter 230A, transmitter 230B, transmitter 230C, and then returning to transmitter 230A. The chunk distributor/marker info adder 226 may start the sequence with any of the transmitters 230A-C.

The transmitters 230A-C may transmit the chunk data streams 234A-C over the bonded channels 201A-C using any transport mechanisms suitable for the individual bonded channels 201A-C. The transport mechanisms may include physical cabling (e.g., fiber optic or cable TV cabling), wireless connections (e.g., satellite, microwave connections, 802.11a/b/g/n connections), or any combination of such connections. An example transmit path 202 of the server 112, or any other device transmitting data streams over multiple bonded channels 201A-C, is discussed further below with respect to FIGS. 3A-3B.

The network device 120 may receive the chunk data streams 234A-C via one or more receivers 240A-C that may include demodulators and/or other components that may be configured to facilitate receiving the chunk data streams 234A-C over the bonded channels 201A-C. The receivers 240A-C may buffer the chunk data streams 234A-C in per-channel buffers 244A-C that are allocated for the bonded channels 201A-C. The collator 246 may retrieve the chunk data streams 234A-C from the buffers 244A-C and may generate a single transport stream, e.g. a fat destination transport stream 248 (FDTS), based at least on the marker packets 232A-F of the chunk data streams 234A-C. For example, the collator 246 may retrieve the marker packets 232-D and may align the following chunks of the chunk data streams 234A-C based at least on the sequence numbers associated with the marker packets 232A-D.

The receive path 204 of the network device 120 may also include a transport inbound processor (TIP) 250. The TIP 250 may process the FDTS 248 based on one or more operating parameters associated with the network device 120. For example, the TIP 250 may execute program identifier (PID) filtering for each channel independently of other channels. To that end, the TIP 250 may identify, select, and output packets from a selected program (e.g., a selected program '1') that are present in the FDTS 248, and drop or discard packets for other programs. In the example shown in FIG. 1, the TIP 122 has recovered program stream '1', which corresponds to the source program stream 206A. The TIP 250 may provide the recovered program stream 252, such as to the output device 124, televisions, laptops, mobile phones, and/or personal computers. Example receive paths 204 of the network device 120 and/or any other device receiving data streams over multiple bonded channels 201A-C, are discussed further below with respect to FIGS. 4-8.

In one or more implementations, the statistical multiplexer 208, the distributor 220, the transmitters 230A-C, the receivers 240A-C, the collator 246 and/or the TIP 250, may be implemented in software (e.g., subroutines and code). In one or more implementations, the statistical multiplexer 208, the distributor 220, the transmitters 230A-C, the receivers 240A-C, the collator 246 and/or the TIP 250 may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3A:
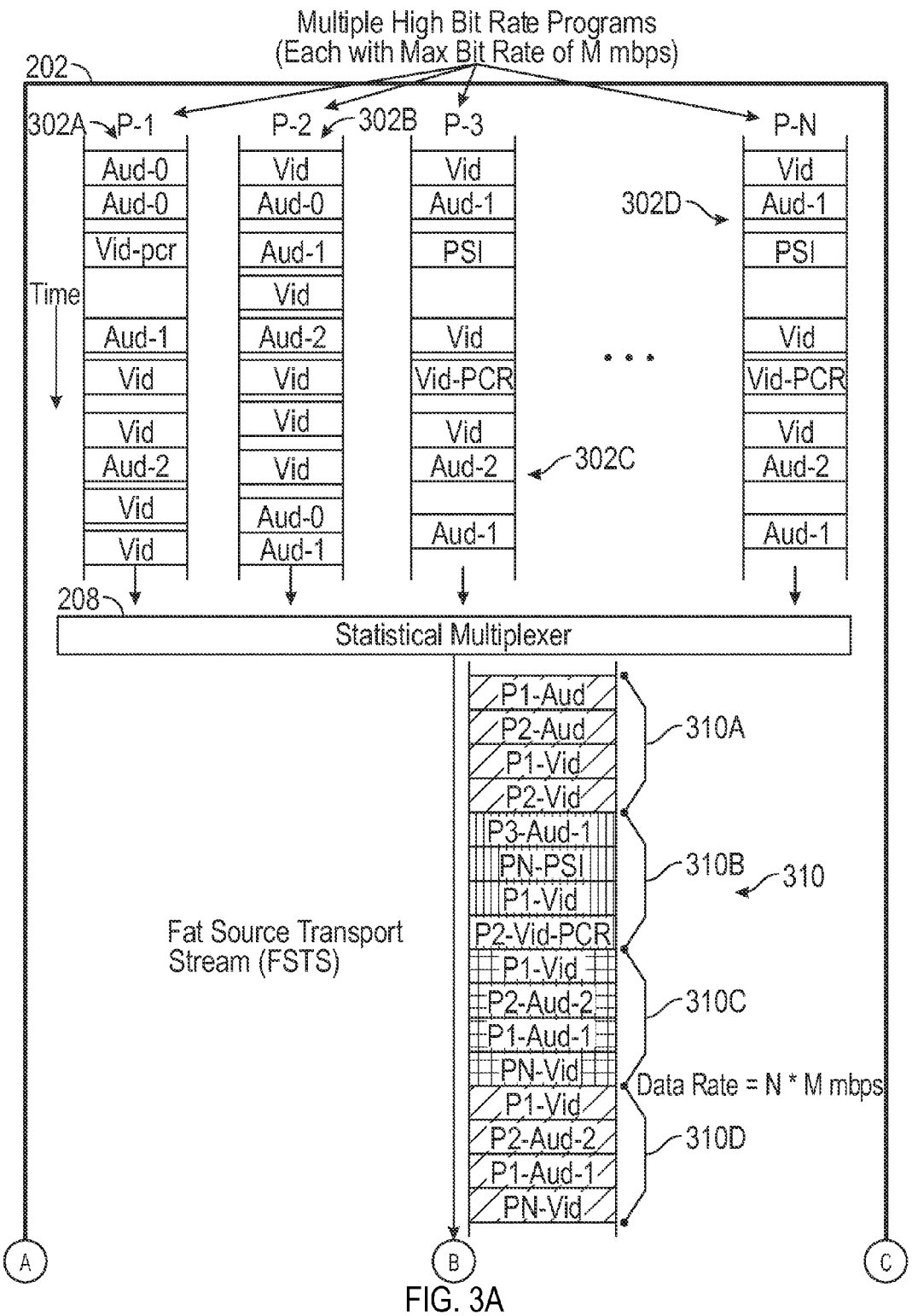
FIGS. 3A-3B illustrate an example transmit path in a system for recovering channel bonded program streams in accordance with one or more implementations.
Figure 3B:
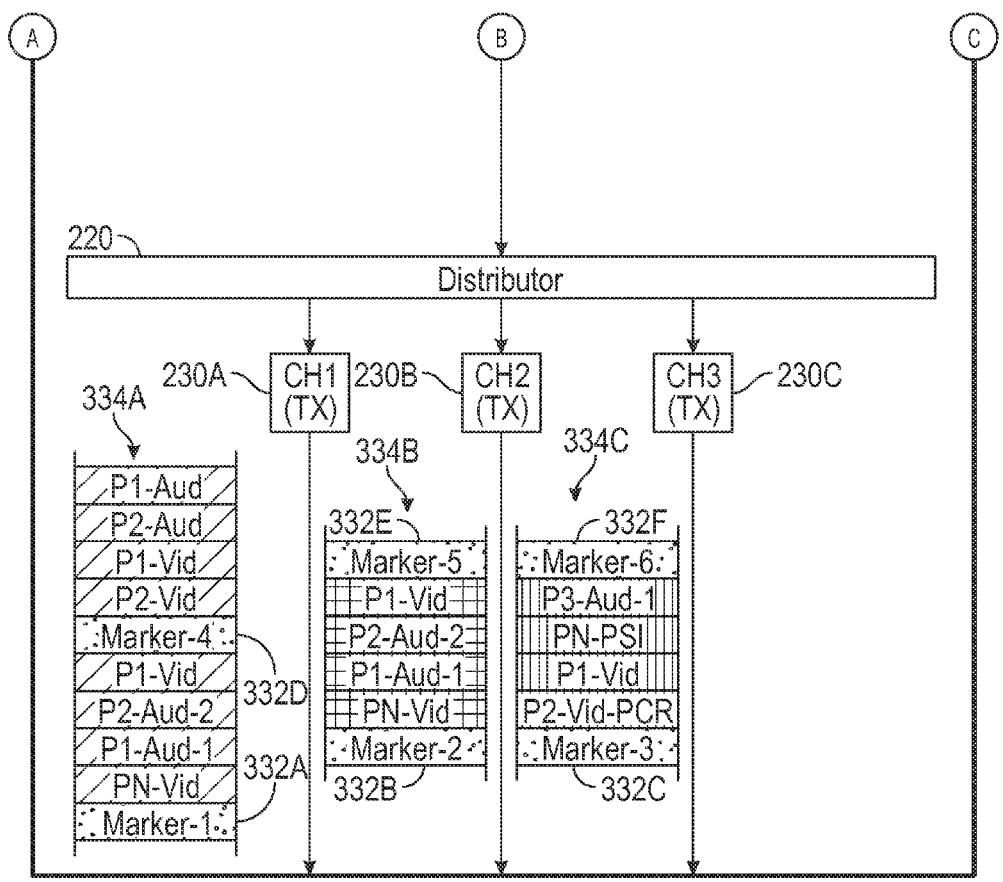

FIGS. 3A-3B illustrate an example transmit path 202 in a system for recovering channel bonded program streams in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The transmit path 202 may include a statistical multiplexer 208, a distributor 220, and transmitters 230A-C. The statistical multiplexer 208 may receive source program streams 302A-D and may multiplex and/or interleave the source program streams 302A-D to generate a fat source transport stream (FSTS) 310. In one or more implementations, the source program streams 302A-D may be multiple different high bit rate programs. For example, the source program stream 302A may correspond to a program 1, the source program stream 302B may correspond to a program 2, the source program stream 302C may correspond to a program 3, and the source program stream 302D may correspond to a program n. The distributor 220 segments the FSTS 310 into chunks 310A-D, generates marker packets 332A-F that are indicative of the boundaries of the chunks 310A-D and/or that provide information related to the chunks 310A-D, and provides the chunk data streams 334A-C to the transmitters 230A-C for transmission over the bonded channels 201A-C.

Figure 4A:
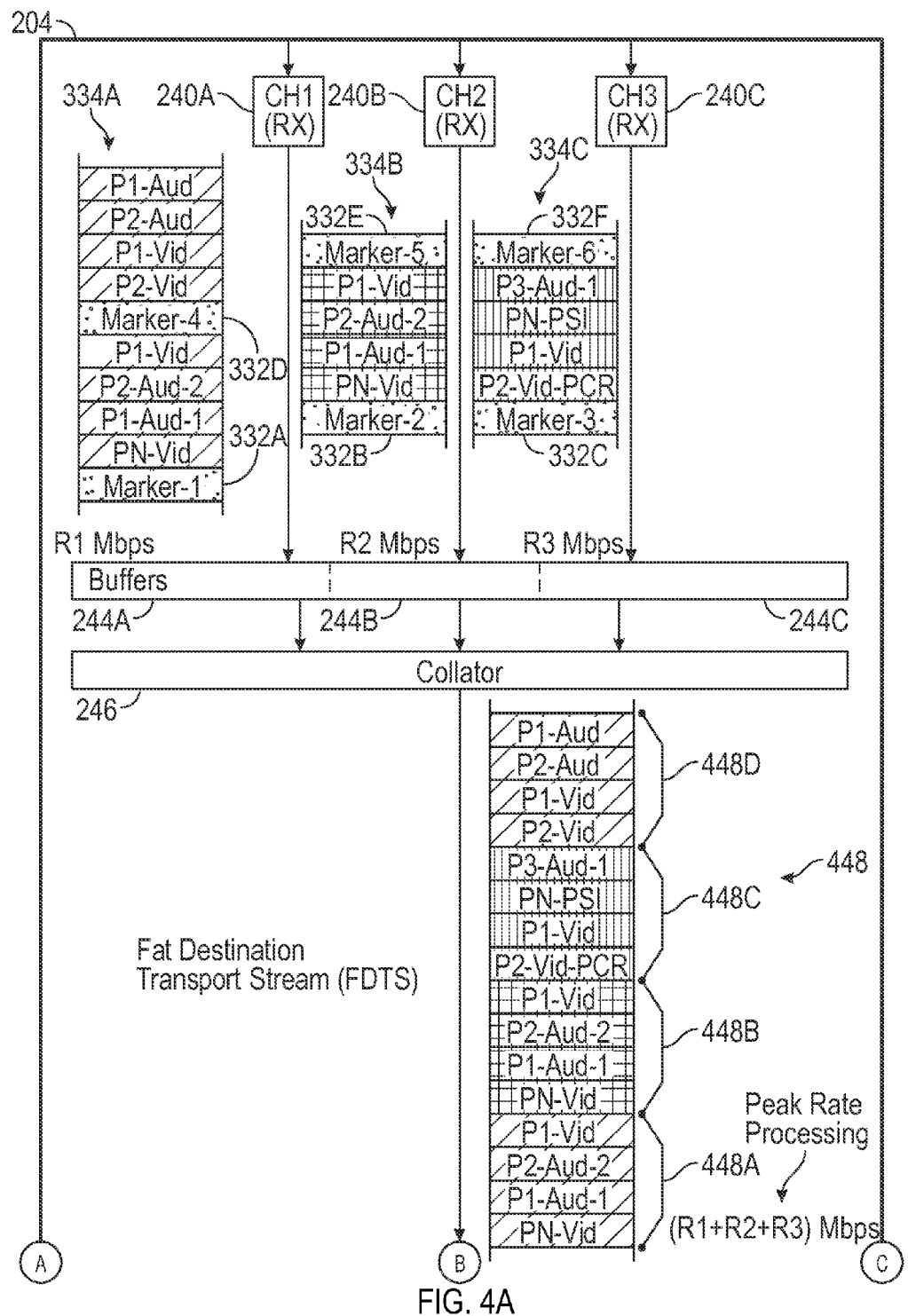
FIGS. 4A-4B illustrate an example receive path in a system for recovering channel bonded program streams in accordance with one or more implementations.
Figure 4B:
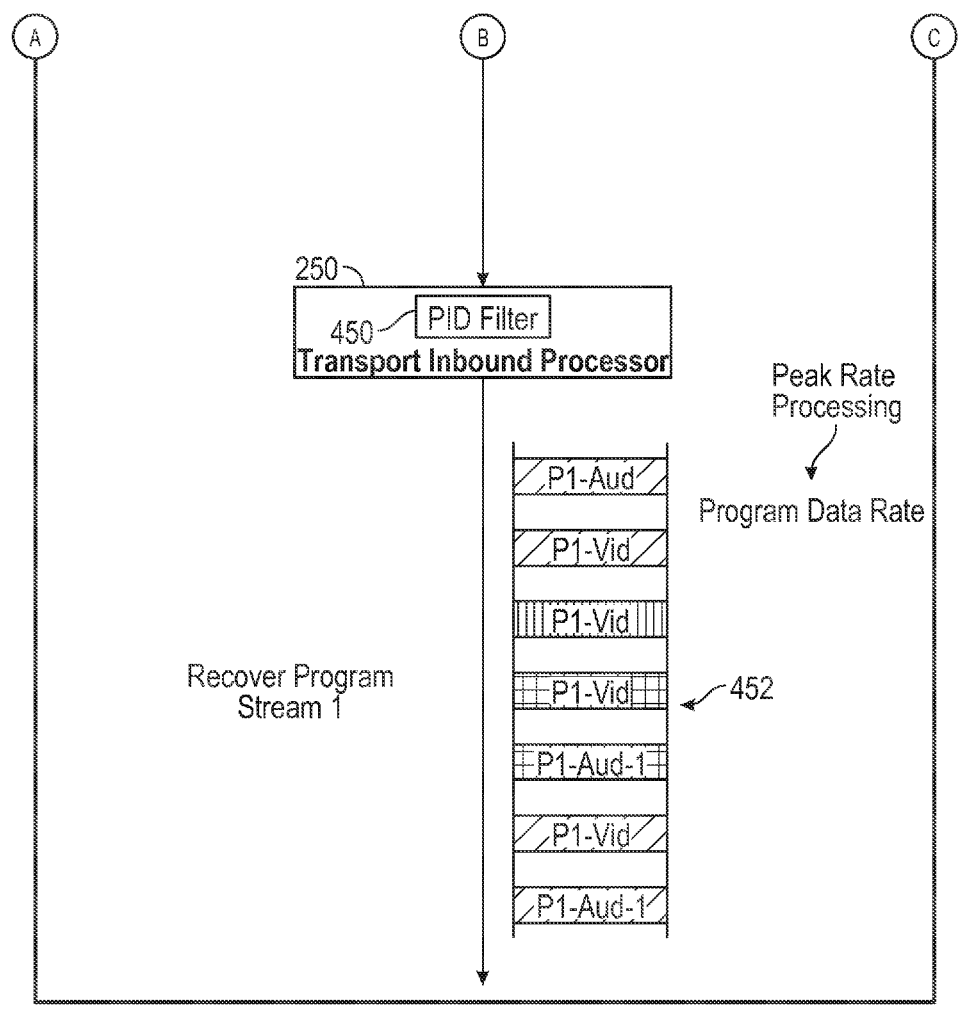

FIGS. 4A-4B illustrate an example receive path 204 in a system for recovering channel bonded program streams in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The receive path 204 may include receivers 240A-C, buffers 244A-C, a collator 246, and a transport inbound processor (TIP) 250. The TIP 250 may include a packet identifier (PID) filter 450. The receivers 240A-C may receive chunk data streams 334A-C, such as from the transmitters 230A-C over the bonded channels 201A-C at data rates of R1, R2, and R3 Mbps, respectively. The chunk data streams 334A-C may include marker packets 332A-F. In one or more implementations, the receivers 240A-C may buffer the chunk data streams 334A-C in the buffers 244A-C, such as to account for latency differences between the bonded channels 201A-C. In one or more implementations, the buffers 244A-C may be allocated on a per-channel basis. For example, the buffer 244A may buffer the chunk data stream 334A received over the channel 201A, the buffer 244B may buffer the chunk data stream 334B received over the channel 201B, and the buffer 244C may buffer the chunk data stream 334C received over the channel 201C.

The collator 246 may retrieve the chunk data streams 334A-C from the buffers 244A-C and may collate the chunk data streams 334A-C based at least on the marker packets 332A-F, e.g. based at least on sequence numbers associated with the marker packets 332A-F, to generate the fat destination transport stream (FDTS) 448. The collator 246 may remove the marker packets 332A-F as the collator 246 generates the FDTS 448. As depicted in FIGS. 4A-4B, the FDTS 448 may include a chunk 448A from the chunk data stream 334A, followed by a chunk 448B from the chunk data stream 334B, followed by a chunk 448C from the chunk data stream 334C, followed by a chunk 448D from the chunk data stream 334A. Thus, the FDTS 448 includes chunks 448A-D from each of the chunk data streams 334A-C transmitted over the bonded channels 201A-C. Accordingly, the TIP 250 may process the FDTS 448 at a peak processing rate that is equivalent to the combined data rates of the bonded channels 201A-C, e.g. R1+R2+R3 Mbps.

The PID filter 450 of the TIP 250 may filter the transport stream packets of the FDTS 448 to recover at least one program stream 452 that may correspond to one of the source program streams 302A-D, such as the source program stream 302A as depicted in FIGS. 4A-4B. Thus, the program stream 452 may be output at the program data rate corresponding to the source program stream 302A.

Figure 5A:
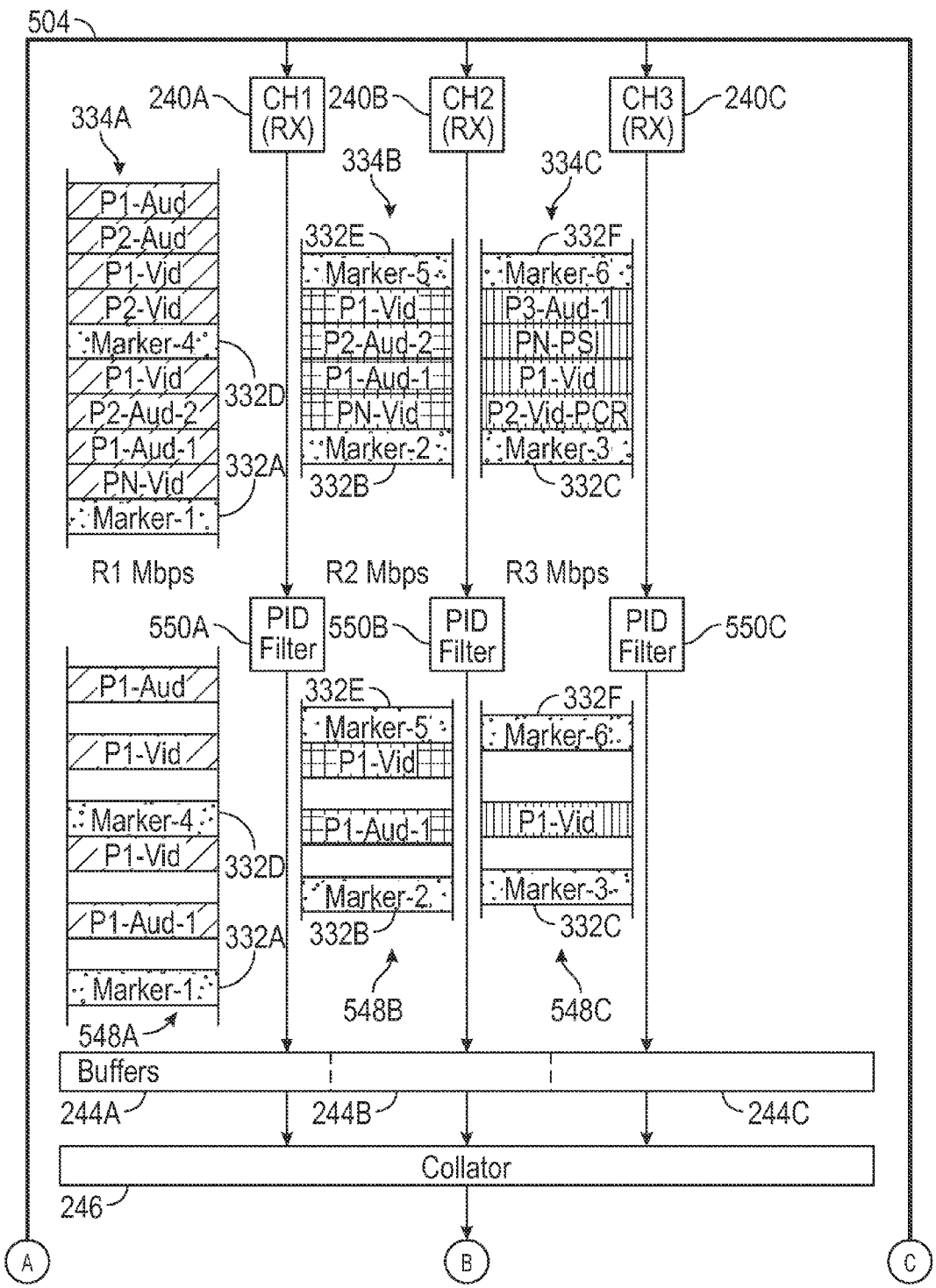
FIGS. 5A-5B illustrate an example receive path in a system for recovering channel bonded program streams in accordance with one or more implementations.
Figure 5B:
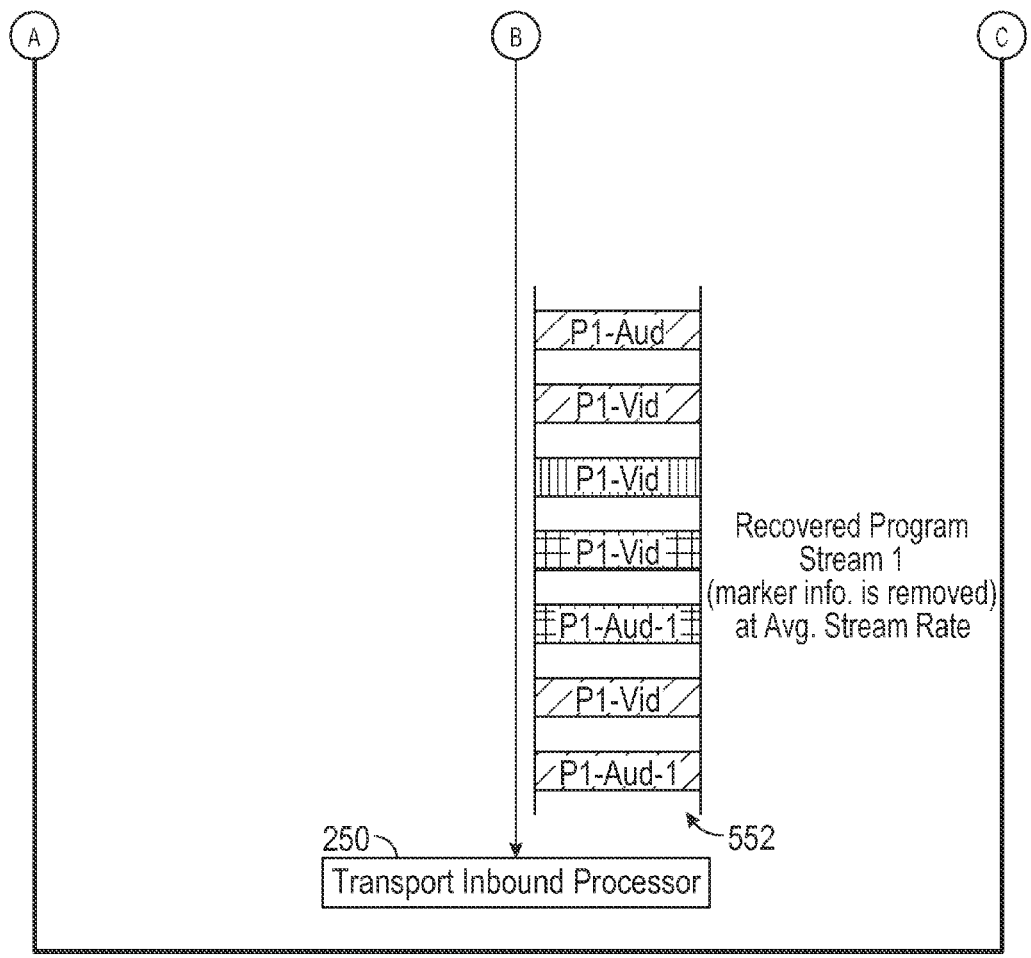

FIGS. 5A-5B illustrate an example receive path 204 in a system for recovering channel bonded program streams in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example receive path 504 may include receivers 240A-C, program identifier (PID) filters 550A-C, buffers 244A-C, a collator 246, and a transport inbound processor 250. The receivers 240A-C may receive chunk data streams 334A-C, such as from the transmitters 230A-C over the bonded channels 201A-C at data rates of R1, R2, and R3 Mbps, respectively. The chunk data streams 334A-C may include marker packets 332A-F. The receivers 240A-C provide the chunk data streams 334A-C to the PID filters 550A-C. The PID filters 550A-C may be configured to filter transport stream packets of the chunk data streams 442A-C that correspond to at least one utilized program identifier (PID), such as a PID corresponding to the source program stream 302A. Thus, the PID filters 550A-C may drop the transport stream packets of the chunk data streams 334A-C that do not correspond to the utilized PID, while maintaining the marker packets 332A-F and/or any other marker information, from the filtered chunk data streams 548A-C.

The filtered chunk data streams 548A-C are buffered in the buffers 244A-C that may be allocated on a per-channel basis. Since the filtered chunk data streams 548A-C only include the transport stream packets for the source program stream 302A that is being utilized, the buffers 244A-C do not need to store transport stream packets for other source program streams 302B-D that are not being utilized. Thus, the buffers 244A-C of the receive path 504 may utilize less memory resources than the buffers 244A-C of the receive path 204 of FIGS. 2 and 4.

The collator 246 retrieves the filtered chunk data streams 548A-C from the buffers 244A-C and collates the filtered chunk data streams 548A-C based at least on the marker packets 332A-F to recover at least one program stream 552 that corresponds to one of the source program streams 302A-D, such as the source program stream 302A. The TIP 250 may then process the program stream 552, such as provide the program stream 552 for presentation to a use via output device 124. Since the program stream 552 only includes transport stream packets for the program being utilized, the TIP 250 of the receive path 504 may only need to process the transport stream packets of the recovered program stream 552 at the average stream rate of the program, rather than at the combined data rates of the bonded channels 201A-C.

Figure 6:
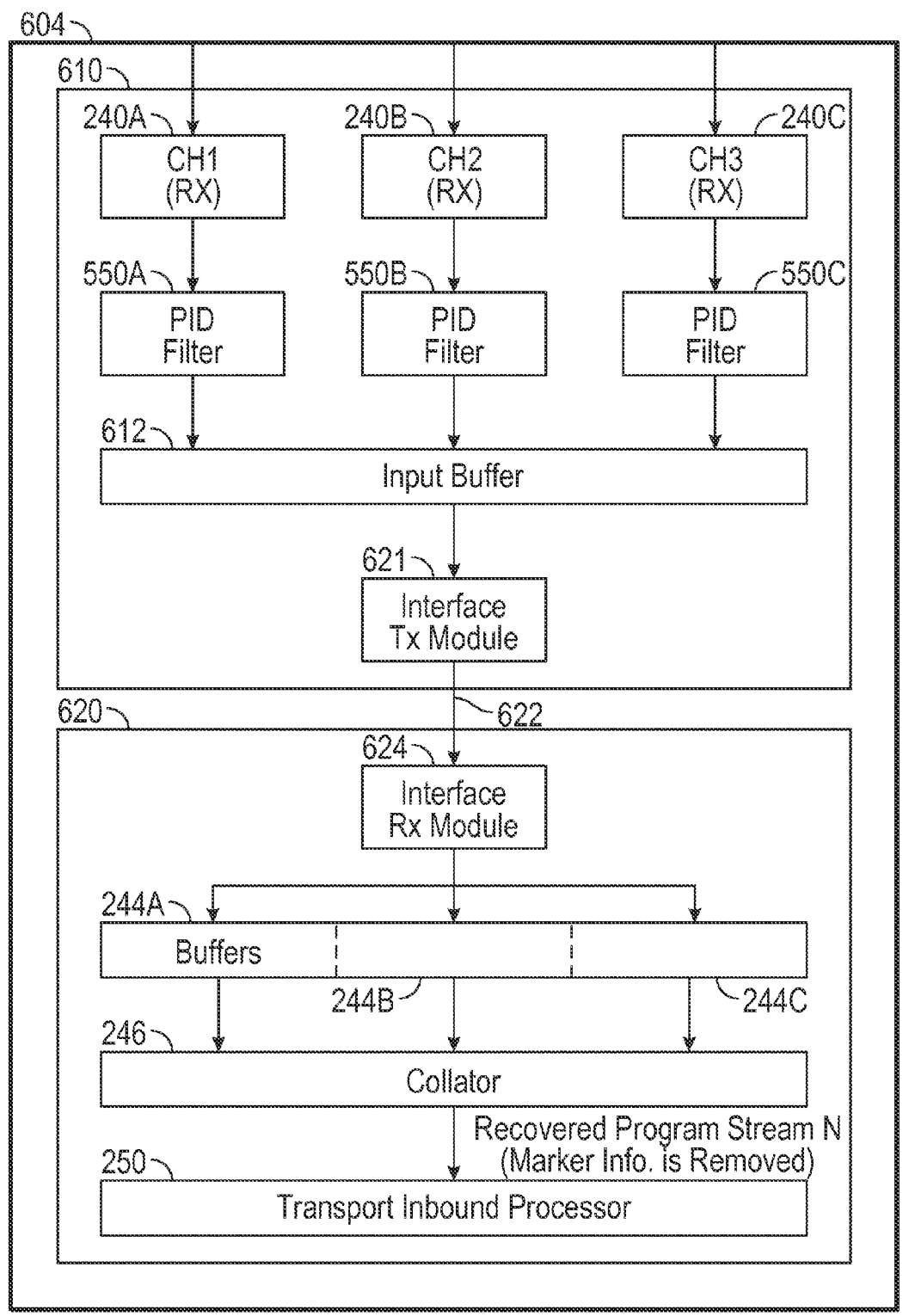
FIG. 6 illustrates an example receive path in a system for recovering channel bonded program streams in accordance with one or more implementations.

FIG. 6 illustrates an example receive path 604 in a system for recovering channel bonded program streams in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The receive path 604 includes a first integrated circuit 610, or a first chip, and a second integrated circuit 620, or a second chip. The first integrated circuit 610 may be communicatively coupled to the second integrated circuit 620 via an interface 622. The first integrated circuit 610 may include receivers 240A-C, PID filters 550A-C, an input buffer 612, and an interface transmit module 621. The second integrated circuit 620 may include an interface receive module 624, buffers 244A-C, a collator 246, and a TIP 250. In one or more implementations, the interface 622 may be a transmission line from the first integrated circuit 610 to the second integrated circuit 620.

The receivers 240A-C may receive the chunk data streams 334A-C and may provide the chunk data streams 334A-C to the PID filters 550A-C. The PID filters 550A-C may be configured to filter the chunk data streams 334A-C based at least on a utilized PID, as is discussed further above with respect to FIGS. 5A-5B. The PID filters 550A-C may be further configured to identify the marker packets 332A-F, and/or other marker information, and associate the marker packets 332A-F with a PID, such as a PID that is not being used to identify any programs and/or a PID that is reserved for marker information. In one or more implementations, the PID filters 550A-C may identify the marker packets 332A-F and may append a PID to the marker packets 332A-F. In one or more implementations, the PID filters 550A-C may identify the marker packets 332A-F and may encapsulate and/or replace the identified marker packets 332A-F with transport stream packets that include the marker packet information along with a PID that is reserved for marker information. In one or more implementations, the PID filters 550A-C may identify marker information in the chunk data streams 334A-C, e.g. marker information that is not contained in a marker packet, and may insert the marker information into transport stream packets that include a PID reserved for marker information. In one or more implementations, the PID reserved for marker information may be fixed and/or may be configurable via registers.

The PID filters 550A-C then store the filtered chunk data streams 548A-C, including transport stream packets that include the marker information and the PID reserved for the marker information, in the input buffer 612. The interface transmit module 621 retrieves the filtered chunk data streams 548A-C from the input buffer 612 and transmits the filtered chunk data streams 548A-C to the second integrated circuit 620 via the interface 622. In one or more implementations, the interface transmit module 621 may serialize the filtered chunk data streams 548A-C before transmitting the filtered chunk data streams 548A-C over the interface 622. In one or more implementations, the interface 622 may be, and/or may include, a serial interface, a parallel interface, and/or a multiplexed transport interface (MTSIF). Thus, the filtered chunk data streams 548A-C may be transferred via a serial interface, a parallel interface, and/or an MTSIF interface.

The interface receive module 624 of the second integrated circuit 620 receives the filtered chunk data streams 548A-C from the first integrated circuit 610 over the interface 622. In one or more implementations, the interface receive module 624 may multiplex the data stream received over the interface 622 to recover the individual filtered chunk data streams 548A-C. The interface receive module 624 stores the filtered chunk data streams 548A-C in the buffers 244A-C. In one or more implementations, the first integrated circuit 610 may retrieve the filtered chunk data streams 548A-C from the input buffer 612 and may store the filtered chunk data streams 548A-C in the buffers 244A-C. In one or more implementations, the PID filters 550A-C may be configured to provide the filtered chunk data streams 548A-C to the buffers 244A-C.

The collator 246 may be configured to retrieve the filtered chunk data streams 548A-C from the buffers 244A-C and recover a program stream 552 based at least on the transport stream packets that contain the PID reserved for marker information, e.g. as inserted to the filtered chunk data streams 548A-C by the PID filters 550A-C. For example, the collator 246 may be configured to identify that the transport stream packets that include the PID reserved for marker information contain marker information. The collator 246 may provide the recovered program stream 552 to the transport inbound processor (TIP) 250.

Thus, the collator 246, and/or the second integrated circuit 620 as a whole, may not need to be configured to identify, recognize, and/or understand the marker information contained in the chunk data streams 334A-C. The collator 246 and/or the second integrated circuit 620 as a whole may identify marker information in the filtered chunk data streams 548A-C by being configured to identify the PID that is reserved for marker information. In this manner, the first integrated circuit 610 can be configured to recognize multiple different forms of marker information in the chunk data streams 334A-C and can convert the marker information into a form that is identifiable by the second integrated circuit 620, such as the collator 246 of the second integrated circuit 620.

In one or more implementations, the first integrated circuit 610 may be a front-end chip and the second integrated circuit 620 may be a back-end chip. Thus, the first integrated circuit 610 may be configured to operate at a peak processing rate that is equivalent to the sum of the data rates of the bonded channels 201A-C, while the second integrated circuit 620 may be configured to operate at an average stream rate corresponding to the program streams 302A-D. Accordingly, the chip configuration illustrated in FIG. 6 may reduce the amount of memory utilized by the input buffer 612 of the first integrated circuit 610, while improving the utilization of the buffers 244A-C, such as DRAM based memories, of the second integrated circuit 620.

Figure 7:
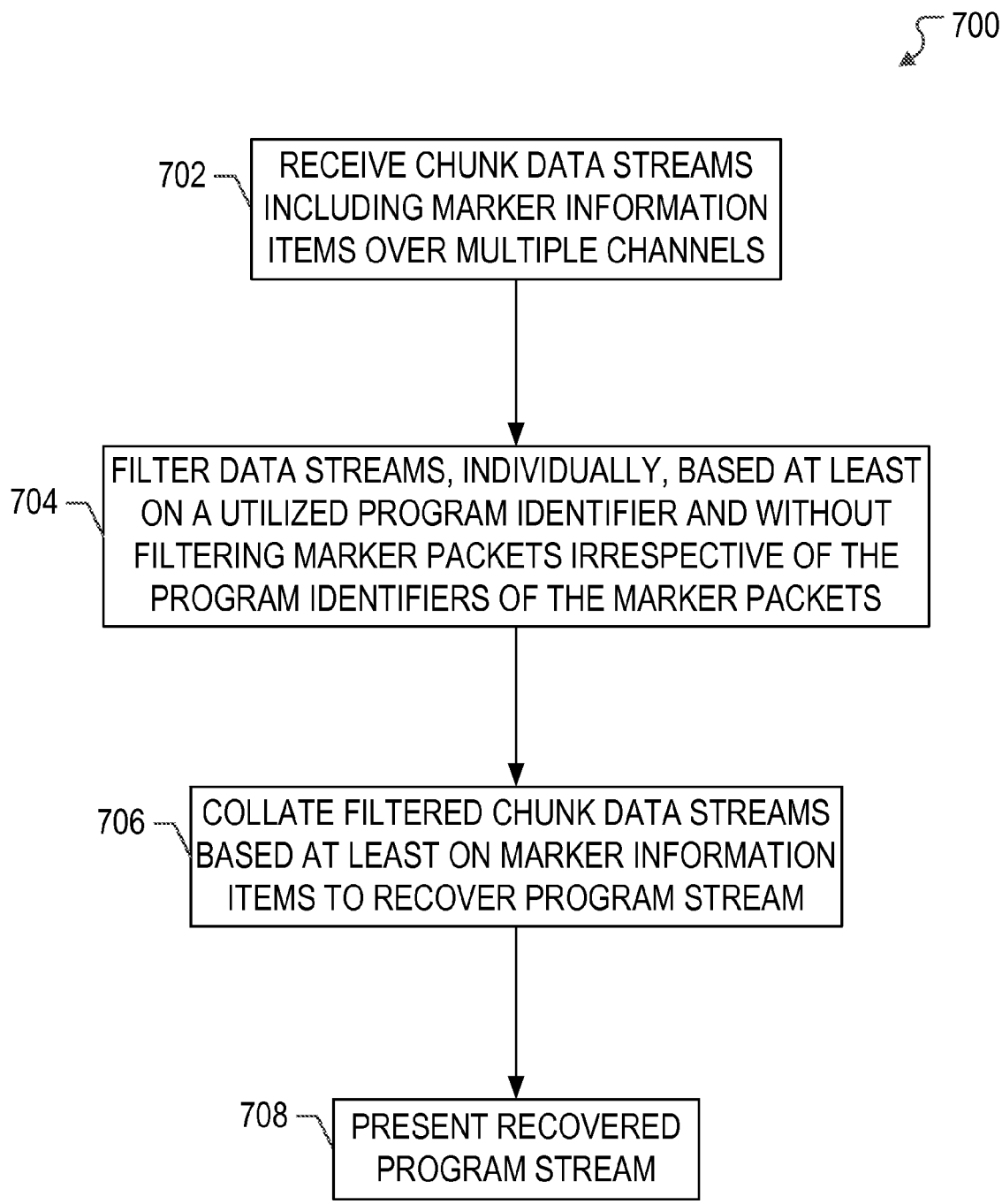
FIG. 7 illustrates a flow diagram of an example process for recovering channel bonded program streams in accordance with one or more implementations.

FIG. 7 illustrates a flow diagram of an example process 700 for recovering channel bonded program streams in accordance with one or more implementations. For explanatory purposes, the example process 700 is described herein with reference to the receive path 504 of FIGS. 5A-5B; however, the example process 700 is not limited to the receive path 504 of FIGS. 5A-5B, and the example process 700 may be performed by one or more other components of the receive path 504. Further for explanatory purposes, the blocks of the example process 700 are described herein as occurring in serial, or linearly. However, multiple blocks of the example process 700 may occur in parallel. In addition, the blocks of the example process 700 need not be performed in the order shown and/or one or more of the blocks of the example process 700 need not be performed.

The receivers 240A-C of the receive path 504, for example of the network device 120, may receive the chunk data streams 334A-C over the multiple bonded channels 201A-C, such as from the transmitters 230A-C (702). The PID filters 550A-C may individually filter the chunk data streams 334A-C based at least on a program identifier being utilized by the network device 120 (704). For example, the PID filters 550A-C may drop any transport stream packets of the chunk data streams 334A-C that do not include a program identifier that corresponds to the utilized program identifier, while maintaining, e.g. not dropping, any marker information in the chunk data streams 334A-C, such as marker packets. The PID filters 550A-C may store the filtered chunk data streams 548A-C in the buffers 244A-C.

The collator 246 may retrieve the filtered chunk data streams 548A-C from the buffers 244A-C and may collate the filtered chunk data streams 548A-C based at least on the marker information, such as the marker packets 332A-F, to recover a program stream 552 corresponding to the utilized program identifier (706). In one or more implementations, the collator 246 may combine, merge, and/or align, the filtered chunk data streams 548A-C based at least on sequence numbers of the marker packets 332A-F to recover the program stream 552. The network device 120 may present the recovered program stream 552 (708), such as on output device 124. In one or more implementations, the network device 120 may provide the recovered program stream 552 to one or more client electronic devices.

Figure 8:
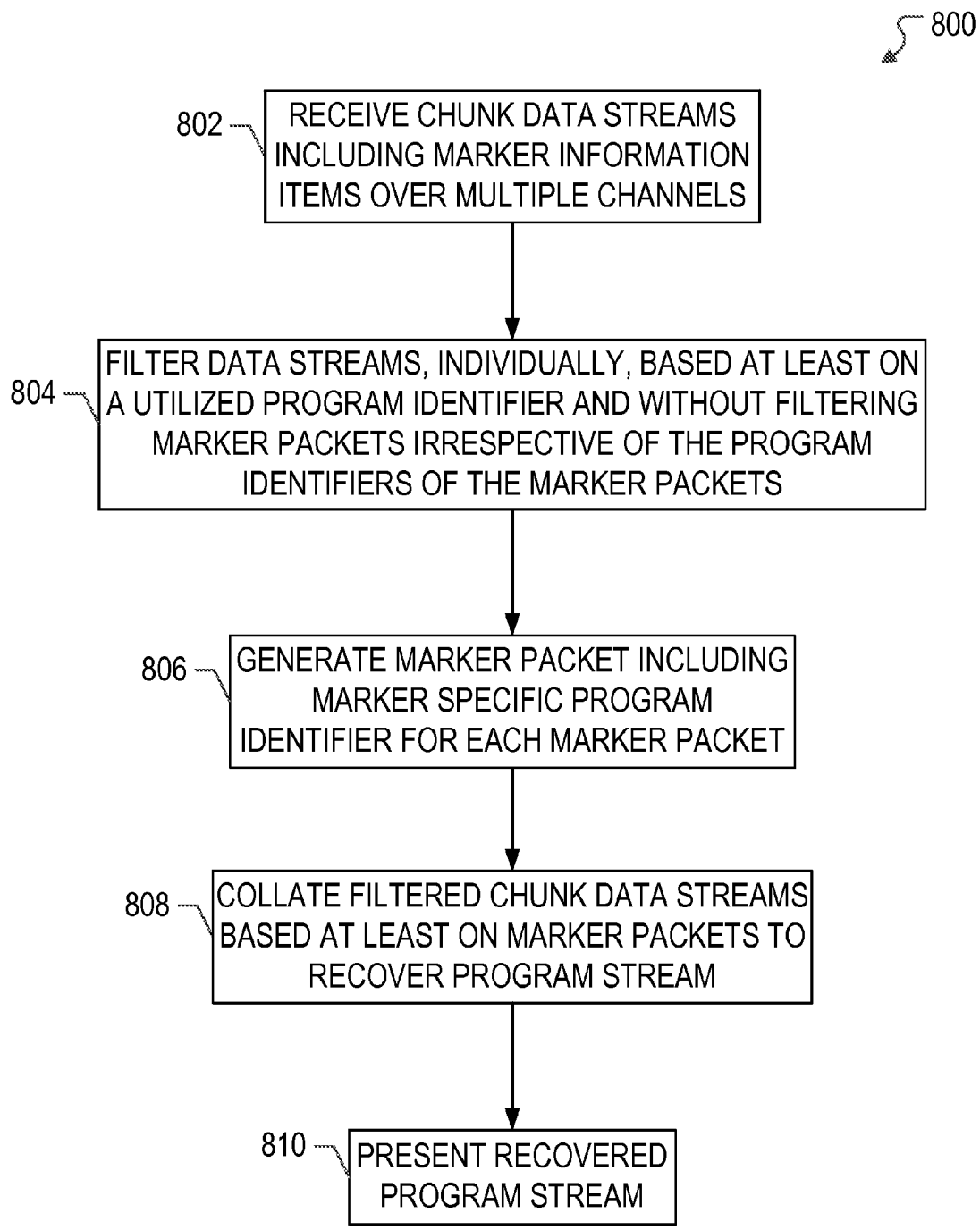
FIG. 8 illustrates a flow diagram of an example process for recovering channel bonded program streams in accordance with one or more implementations.

FIG. 8 illustrates a flow diagram of an example process 800 for recovering channel bonded program streams in accordance with one or more implementations. For explanatory purposes, the example process 800 is described herein with reference to the receive path 604 of FIG. 6; however, the example process 800 is not limited to the receive path 604 of FIG. 6, and the example process 800 may be performed by one or more other components of the receive path 604. Further for explanatory purposes, the blocks of the example process 800 are described herein as occurring in serial, or linearly. However, multiple blocks of the example process 800 may occur in parallel. In addition, the blocks of the example process 800 need not be performed in the order shown and/or one or more of the blocks of the example process 800 need not be performed.

The receivers 240A-C of the receive path 604, for example of the network device 120, may receive the chunk data streams 334A-C over the multiple bonded channels 201A-C, such as from the transmitters 230A-C (802). The PID filters 550A-C may individually filter the chunk data streams 334A-C based at least on a program identifier being utilized by the network device 120 (804). For example, the PID filters 550A-C may drop any transport stream packets of the chunk data streams 334A-C that do not include a program identifier that corresponds to the utilized program identifier.

The PID filters 550A-C may also be configured to identify marker information in the chunk data streams 334A-C, e.g. based on configuration information transmitted between the server 112 and the network device 120, and to insert marker packets 332A-F into the filtered chunk data streams 548A-C that include the marker information along with a PID reserved for marker information (806). The PID filters 550A-C may provide the filtered chunk data streams 548A-C, that include the inserted marker packets 332A-F, to the buffers 244A-C, e.g. via the input buffer 612 and the interface transmit module 621 of the first integrated circuit 610, the interface 622, and the interface receive module 624 of the second integrated circuit 620.

The collator 246 may retrieve the filtered chunk data streams 548A-C, including the marker packets 332A-F inserted by the filters 550A-C, from the buffers 244A-C and may collate the filtered chunk data streams 548A-C based at least on the inserted marker packets 332A-F to recover the program stream 552 that corresponds to the utilized PID (808). For example, the collator 246 may combine, merge, and/or align the filtered chunk data streams 548A-C based at least on sequence numbers associated with the marker packets 332A-F, such that the order of the transport stream packets in the recovered program stream 552 corresponds to the order of the transport stream packets in one of the source program streams 302A-D, such as the source program stream 302A. The network device 120 may present the recovered program stream 552 (810), such as on output device 124. In one or more implementations, the network device 120 may provide the recovered program stream 552 to one or more client electronic devices.

Figure 9:
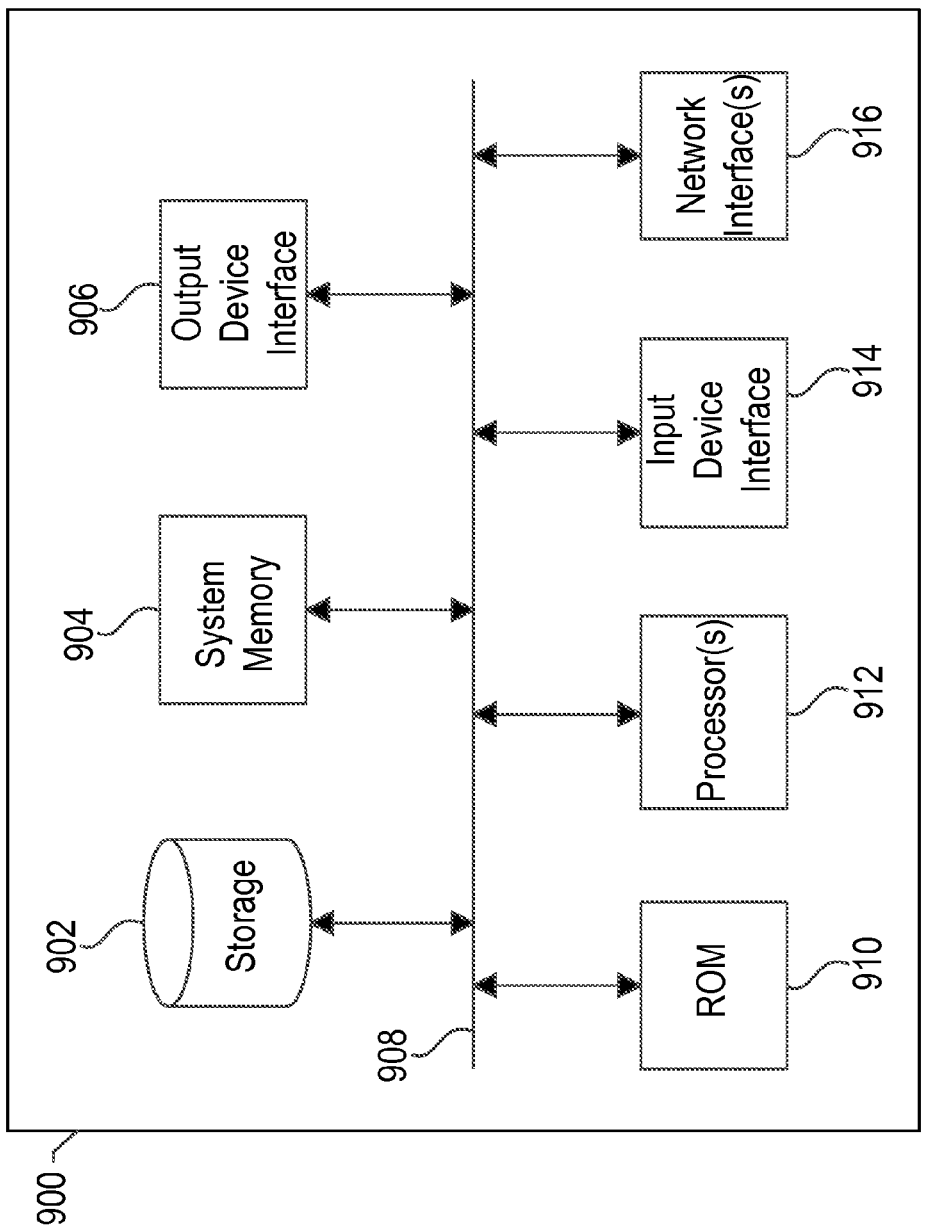
FIG. 9 conceptually illustrates an electronic system with which one or more implementations of the subject technology may be implemented.

FIG. 9 conceptually illustrates an electronic system 900 with which one or more implementations of the subject technology may be implemented. The electronic system 900, for example, can be a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 900 can be, and/or can be a part of, the network device 120, and/or the server 112. Such an electronic system includes various types of computer readable media and interfaces for various other types of computer readable media. The electronic system 900 includes a bus 908, one or more processor(s) 912, a system memory 904 or buffer, a read-only memory (ROM) 910, a permanent storage device 902, an input device interface 914, an output device interface 906, and one or more network interface(s) 916, or subsets and variations thereof.

The bus 908 collectively represents all system, peripheral, and chipset buses that communicatively connect the numerous internal devices of the electronic system 900. In one or more implementations, the bus 908 communicatively connects the one or more processor(s) 912 with the ROM 910, the system memory 904, and the permanent storage device 902. From these various memory units, the one or more processor(s) 912 retrieve instructions to execute and data to process in order to execute the processes of the subject disclosure. The one or more processor(s) 912 can be a single processor or a multi-core processor in different implementations.

The ROM 910 stores static data and instructions that are needed by the one or more processor(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processor(s) 912 may need at runtime. In one or more implementations, the processes of the subject disclosure are stored in the system memory 904, the permanent storage device 902, and/or the ROM 910. From these various memory units, the one or more processor(s) 912 retrieve instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 9, bus 908 also couples electronic system 900 to one or more networks (not shown), network device 120, and/or server 112, through one or more network interface(s) 916. One or more network interface(s) may include an Ethernet interface, a WiFi interface, a multimedia over coax alliance (MoCA) interface, a reduced gigabit media independent interface (RGMII), or generally any interface for connecting to a network. In this manner, electronic system 900 can be a part of one or more networks of computers (such as a local area network ("LAN"), a wide area network ("WAN"), or an Intranet, or a network of networks, such as the Internet. Any or all components of electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for recovering channel bonded program streams, the method comprising:
    receiving data streams comprising chunks of transport stream packets of a single source transport stream over a plurality of channels, each of the data streams comprising inserted marker information items that each comprise a distinct sequence number and indicate a boundary of one of the chunks, and each of the transport stream packets comprising a program identifier that identifies one of a plurality of programs corresponding to each of the transport stream packets, wherein the marker information items are distinct from the transport stream packets and at least one of the chunks includes at least two of the transport stream packets;
    filtering the transport stream packets of each of the data streams, individually, based at least on a utilized program identifier while generating and inserting a respective marker packet for each respective marker information item of each of the data streams, wherein the respective marker packet comprises at least the distinct sequence number of the corresponding respective marker information item; and
    merging the data streams, based at least on the sequence numbers of the inserted marker packets, to recover a program stream corresponding to the utilized program identifier.

2. The method of claim 1, wherein filtering the transport stream packets of each of the data streams, individually, based at least on the utilized program identifier while generating and inserting a respective marker packet for each respective marker information item of each of the data streams comprises:
    dropping, from each of the data streams, the transport stream packets that are exclusive of the utilized program identifier while replacing each respective marker information item of each of the data streams with the corresponding respective marker packet.

3. The method of claim 1, wherein each of the data streams is received over one of the plurality of channels.

4. The method of claim 1, wherein
    each respective marker packet further comprises a marker packet program identifier that is reserved for the marker packets, wherein the marker packet program identifier is configurable via registers.

5. The method of claim 1, wherein a first channel of the plurality of channels is associated with a first transmission medium and a second channel of the plurality of channels is associated with a second transmission medium that is different than the first transmission medium.

6. The method of claim 1, further comprising:
    presenting the recovered program stream, storing the recovered program stream, or transmitting the recovered program stream to a client device.

7. The method of claim 1, wherein the receiving, the filtering and the merging are performed completely by a front-end chip that comprises at least one demodulator, completely by a back-end chip, or by a combination of the front-end chip and the back-end chip.

8. A system comprising:
    a first integrated circuit that comprises:
        a plurality of receivers configured to receive data streams that include chunks of transport stream packets of a single source transport stream over a plurality of channels, each of the data streams comprising marker information items that each indicate a boundary of one of the chunks, each of the transport stream packets comprising a program identifier that identifies one of a plurality of programs corresponding to each of the transport stream packets, and at least one of the chunks including at least two of the transport stream packets; and a plurality of filters coupled to the plurality of receivers, each of the plurality of filters configured to receive one of the data streams from one of the plurality of receivers, to filter the transport stream packets of the one of the data streams based at least on a utilized program identifier, and to generate and insert a marker packet for each marker information item of the one of the data streams, wherein the marker packet comprises at least a portion of the marker information item or a marker-specific program identifier; and a second integrated circuit that comprises a collator that is configured to receive the filtered data streams from the plurality of filters and to merge the filtered data streams, based at least on an order associated with the marker packets of the filtered data streams, to recover a program stream corresponding to the utilized program identifier.

9. The system of claim 8, wherein the second integrated circuit is further configured to present the recovered program stream.

10. The system of claim 8, wherein each of the plurality of receivers receives one of the data streams.

11. The system of claim 8, wherein the first integrated circuit further comprises an interface transmit module that is configured to serialize the filtered data streams and transmit the serialized filtered data streams to the second integrated circuit over an interface.

12. The system of claim 11, wherein the second integrated circuit comprises a interface receive module that is configured to receive the serialized filtered data streams over the interface from the first integrated circuit and deserialize the serialized filtered data streams.

13. The system of claim 12, wherein the interface comprises a transmission line.

14. The system of claim 8, wherein a first channel of the plurality of channels is associated with a first transmission medium and a second channel of the plurality of channels is associated with a second transmission medium that is different than the first transmission medium.

15. The system of claim 8, wherein the plurality of filters are configured to drop, from the data streams, the transport stream packets that are exclusive of the utilized program identifier while maintaining the marker information items of each of the data streams.

16. A non-transitory computer-readable storage medium storing instructions, the instructions being executable by a processor and the instructions comprising:

instructions to receive data streams comprising chunks of transport stream packets of a single source transport stream over a plurality of channels, each of the data streams comprising marker information items that each indicate a boundary of one of the chunks, each of the transport stream packets comprising a program identifier that identifies one of a plurality of programs corresponding to each of the transport stream packets, and the marker information items being distinct from the transport stream packets;

instructions to filter the transport stream packets of each of the data streams, individually, based at least on a utilized program identifier;

instructions to generate and insert a marker packet for each marker information item of each of the data streams, individually, while the transport stream packets of each of the data streams are being filtered, wherein the marker packet comprises at least a portion of the marker information item and a marker-specific program identifier; and instructions to merge the data streams, based at least on the marker packets inserted into the data streams, to recover a program stream corresponding to the utilized program identifier.

17. The non-transitory computer-readable storage medium of claim 16, wherein the instructions to merge the data streams, based at least on the marker packets of the data streams, to recover the program stream corresponding to the utilized program identifier comprises:

instructions to identify the marker packets of the data streams based at least on the marker-specific program identifier; and instructions to merge the data streams, based at least on the identified marker packets of the data streams, to recover the program stream corresponding to the utilized program identifier.

18. The non-transitory computer-readable storage medium of claim 16, wherein the instructions to generate the marker packet for each marker information item of each of the data streams, individually, comprise:

instructions to generate, by a first chip, the marker packet for each marker information item of each of the data streams, individually.

19. The non-transitory computer-readable storage medium of claim 16, wherein the instructions to merge the data streams, based at least on the marker packets of the data streams, to recover the program stream corresponding to the utilized program identifier comprise:

instructions to merge, by a second chip, the data streams, based at least on the marker packets of the data streams, to recover the program stream corresponding to the utilized program identifier.

20. The non-transitory computer-readable storage medium of claim 16, wherein the instructions further comprise:

instructions to present, store, or transmit the recovered program stream.

* * * * *